United States Patent Office 3,423,206

Patented Jan. 21, 1969

3,423,206

LIGHT-SENSITIVE COLOR FORMING REPRODUCTION MATERIALS

Ernst-August Hackmann, Wiesbaden-Biebrich, Germany, assignor to Kalle Aktiengesellschaft, Wiesbaden-Biebrich, Germany No Drawing. Filed July 6, 1965, Ser. No. 469,872

U.S. Cl. 96—48 11 Claims

Int. Cl. G03c *1/00*

ABSTRACT OF THE DISCLOSURE

Light-sensitive negative-working reproduction materials suitable for use in image copying with incandescent as well as ultraviolet light source is prepared by coating a support with a light-sensitive imaging composition comprising a halogenated hydrocarbon, an indole, a ferrocene, and an aldehyde.

The present invention relates to light-sensitive layers and more particularly refers to novel negative-working reproduction materials which are sensitive to the visible region of the spectrum as well as to the ultraviolet region.

Light-sensitive systems which consist of certain organic halogen compounds such as bromoform, iodoform or the like and indoles or substituted indoles are known. However, application of these systems has been limited by their poor light-sensitivity. Further, such systems are light-sensitive in the ultraviolet region of the spectrum.

The reproduction material according to the present invention comprises a support, preferably of paper or plastic film, and a light-sensitive layer which comprises a halogenated hydrocarbon, a substituted or unsubstituted indole having no substituent in the 3-position, a ferrocene which may be substituted, and an aldehyde, preferably an aromatic aldehyde.

One object of the present invention is to provide light-sensitive reproduction materials which overcome the disadvantages of the prior art.

Another object is to provide light-sensitive reproduction materials which are sensitive in the visible region of the spectrum as well as to the ultraviolet region.

Other objects will become apparent in the course of the following specification.

According to the present invention, halogenated hydrocarbons corresponding to the following general formula may be used:

$$\begin{array}{c} R \\ | \\ R_1-C-X \\ | \\ R_1 \end{array}$$

wherein X is selected from the group consisting of chlorine, bromine, and iodine; and R, $R_1$ and $R_2$ are selected from the group consisting of chlorine, bromine, iodine, hydrogen, alkyl, halogen-substituted alkyl, aryl, aralkyl, alkenyl, and heterocyclic ring. R, $R_1$ and $R_2$ may be the same or different.

Furthermore, carboxylic acid chloride and derivatives, thereof, and halogenated synthetic substances, such as chlorinated rubber, may be used. A halogenated hydrocarbon which yields particularly good results is tetrabromomethane.

Besides indole itself, 1- and/or 2-substituted indoles or indoles bearing a substituent at the benzene ring may be used as the substituted or unsubstituted indoles having no substituent in the 3-position. Particularly good results are obtained, for example, with: indole, 2-methyl-indole, 1,2-dimethyl-indole, 2-phenyl-indole, 1-methyl-2-phenyl-indole, 2-methyl-5-nitro-indole, and 5-amino-1,2-dimethyl-indole.

In addition to ferrocene, its substitution products, such as diacetyl-ferrocene, dipropionyl ferrocene, dibenzoyl ferrocene, bis-(3-nitrobenzoyl)-ferrocene, bis-(4-dimethylamino-benzoyl)-ferrocene, and ferrocene dicarboxylic acid, may be used.

Aldehydes which are suitable for the present invention are benzaldehyde, substituted benzaldehyde, naphthaldehyde, substituted naphthaldehyde, aryl-substituted formaldehyde, alkyl-substituted formaldehyde, aralkyl-substituted formaldehyde, cinnamic aldehyde, substituted cinnamic aldehyde, and aldehydes linked to a heterocyclic system. Particular mention is made of methylene-dihydroxy-benzaldehyde, dimethylamino-benzaldehyde p-chloro-benzaldehyde, 2,3-naphthalene-dialdehyde, 2-phenyl-propionaldehyde, o-nitrocinnamic aldehyde, and N-ethyl-carbazole-3-aldehyde.

For the preparation of the reproduction material according to the present invention, a solution of halogenated hydrocarbon, ferrocene, indole, and aldehyde is applied to a support and the solvent is evaporated. Suitable supports are wood, glass, plastic film, metal foil, fabrics and, in particular, paper. Synthetic resins and waxes may be added to the light-sensitive substances for improving their adhesion to a support with a smooth surface. In order to improve the shelf-life of the unexposed reproduction materials, an essential component of the light-sensitive layer, such as the halogenated hydrocarbons, may be applied in the form of a gas shortly before exposure.

As light sources to which the present materials are exposed, conventional incandescent light bulbs as well as commercial mixed light or ultraviolet radiators may be used. Fixation of the exposed material is effected by a brief heat treatment at 80 to 150° C., which may be performed in a drying cupboard, by means of heated plates or an infrared source, or by passing the material over a heated roller. This heat-fixation of the copy by evaporation of the ferrocene and halogenated hydrocarbons causes a considerable increase in the dyestuff formation in the exposed areas.

The material according to the present invention may be used for the preparation of contact copies as well as reflex copies. It is particularly suitable for the preparation of re-enlargements from microfilms. As compared with hitherto known materials containing indoles or derivatives thereof, the materials of the present invention have the advantage that they are more light-sensitive, especially in the visible range of the spectrum, and that the color shades obtainable can be varied by adding different aldehydes.

The invention is further illustrated by reference to the following specific examples, but it is not limited to the scope of these examples.

Example 1

1 g. of tetrabromomethane, 0.3 g. of ferrocene, 1 g. of 2-methylindole, and 0.2 g. of methylene-dihydroxy-benzaldehyde, were dissolved in 10 ml. of trichloroethylene, and a base paper customarily used in the reproduction field was soaked with this solution. After evaporation of the solvent, the material was exposed for 30 seconds under a master using a 200 watt incandescent bulb at a distance of 30 cm. as the light source. The material was then heated for two minutes to 100° C. in a drying cupboard so that excess tetrabromomethane and ferrocene were volatilized from the paper. A negative, dark-red copy on a colorless background was obtained.

Example 2

Equally good results were obtained by replacing the methylene-dihydroxy-benzaldehyde used in Example 1 by 4-nitrocinnamic aldehyde. Green images were obtained on a colorless background.

Example 3

1 g. of iodoform, 0.3 g. of ferrocene, 1 g. of 1,2-dimethyl-indole, and 0.2 g. of benzene-1,4-dialdehyde, were dissolved in 10 ml. of trichloroethylene and a base paper was soaked with this solution. After evaporation of the solvent, the material was exposed for five seconds under a master to the light of a carbon arc lamp. The exposed paper was fixed by passing it under an infrared radiator. Reddish-brown images were obtained on a colorless background.

Example 4

1 g. of tetrabromomethane, 0.3 g. of ferrocene, 1 g. of 5-amino-2-methyl-indole, and 0.2 g. of cinnamic aldehyde were dissolved in 10 ml. of trichloroethylene, and an acetate film was soaked with this solution. After evaporation of the solvent, the material was exposed for ten seconds under a master, using a 500-watt mixed light radiator as the light source. Fixation was performed in a drying cupboard. The bluish-green dyestuff formed had a very good screening capacity, so that the foil could be used for making further reproductions as on photoprinting paper.

Example 5

1 g. of tetrabromomethane, 0.3 g. of ferrocene, 1 g. of 2-phenyl-indole, and 0.2 g. of 2-hydroxy-benzaldehyde-3-carboxylic acid were dissolved in 10 ml. of trichloroethylene, and a base paper was soaked with this solution. The material as exposed under a master to the light of a 200-watt incandescent bulb and then fixed in a drying cupboard. A greyish-black negative copy of the master was obtained on a colorless background.

Example 6

1 g. of tetrabromomethane, 0.3 g. of ferrocene, 1 g. of 2-methyl-indole, and 0.2 g. of dimethylamino-benzaldehyde were dissolved in 10 ml. of trichloroethylene, and the solution was coated onto transparent paper. An 8 times re-enlargement from a silver halide film negative was prepared by means of a 500-watt projector lamp. The time of exposure was 30 seconds. After fixation in a drying cupboard, a clearly-legible red image was obtained on a colorless background. The transparency may be used as an intermediate for the production of further copies.

Example 7

1 g. of 1,2-dimethyl-indole, 1 g. of tetrabromomethane, 0.3 g. of ferrocene, 0.1 g. of cinnamic aldehyde, 0.1 g. of dimethylamino-benzaldehyde, and 1 g. of polystyrene were dissolved in 10 ml. of trichloroethylene, and a base paper was soaked with this solution. After evaporation of the solvent, the material was exposed to a light source produced by a 200-watt incandescent bulb, for 30 seconds under an intermediate original obtained in the course of Example 6, and then was fixed for two minutes in a drying cupboard at 100° C. A blue image was obtained on a colorless background.

It is apparent that the described examples are capable of many variations and modifications. All such variations and modifications are to be included within the scope of the present invention.

What is claimed is:

1. A light-sensitive reproduction material comprising a support, and a light-sensitive layer coated on said support, said layer comprising:

(a) a halogenated hydrocarbon having the general formula:

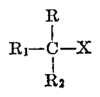

wherein X is a member selected from the group consisting of chlorine, bromine and iodine, and R, $R_1$ and $R_2$ are each independently selected from the group consisting of chlorine, bromine, iodine, hydrogen, alkyl, halogen-substituted alkyl, aryl, aralkyl, and alkenyl substituents;

(b) an indole compound having no substituent in the 3-position;

(c) a ferrocene; and (d) an aldehyde selected from the group consisting of benzaldehyde, substituted benzaldehyde, naphthaldehyde, substituted naphthaldehyde, aryl-substitueed formaldehyde, alkyl-substituted formaldehyde, aralkyl-substituted formaldehyde, cinnamic aldehyde, substituted cinnamic aldehydes, and aldehydes linked to a heterocyclic system, said layer being sensitive to the visible region of the spectrum as well as to the ultraviolet region.

2. A material in accordance with claim 1 in which the halogenated hydrocarbon is tetrabromomethane.

3. A material in accordance with claim 1 in which said indole is selected from the group consisting of: indole, 2-methyl-indole, 1,2-dimethyl-indole, 2-phenyl-indole, 1-methyl-2-phenyl-indole, 2-methyl-5-nitro-indole, and 5-amino-1,2-dimethyl-indole.

4. A material in accordance with claim 1 in which said ferrocene is selected from the group consisting of ferrocene, diacetyl ferrocene, dipropionyl ferrocene, dibenzoyl ferrocene, bis-(3-nitrobenzoyl)-ferrocene, bis-(4-dimethylamino-benzoyl)-ferrocene, and ferrocene dicarboxylic acid.

5. A material in accordance with claim 1 in which said aldehyde is selected from the group consisting of: methylene - dihydroxy-benzaldehyde, dimethylamino - benzaldehyde, p-chloro-benzaldehyde, 2,3-naphthalene-dialdehyde, 2-phenyl-propionaldehyde, o-nitro-cinnamic aldehyde, and N-ethyl-carbazole-3-aldehyde.

6. A light-sensitive reproduction material comprising
a support; and
a light-sensitive layer coated on said support, said layer comprising tetrabromomethane, ferrocene, 2-methyl-indole, and methylene-dihydroxy-benzaldehyde, said layer being sensitive to the visible region of the spectrum as well as to the ultraviolet region.

7. A light-sensitive reproduction material, which comprises
a support; and
a light-sensitive layer coated on said support, said layer comprising iodoform, ferrocene, 1,2-dimethyl-indole, and benzene-1,4-dialdehyde, said layer being sensitive to the visible region of the spectrum as well as to the ultraviolet region.

8. A light-sensitive reproduction material comprising
a support; and
a light-sensitive layer coated on said support, said layer comprising tetrabromomethane, ferrocene, 5-amino-2-methyl-indole, and cinnamic aldehyde, said layer being sensitive to the visible region of the spectrum as well as to the ultraviolet region.

9. A light-sensitive reproduction material comprising
a support, and
a light-sensitive layer coated on said support, said layer comprising tetrabromomethane, ferrocene, 2-phenyl-indole, and 2-hydroxy-benzaldehyde-3-carboxylic acid, said layer being sensitive to the visible region of the spectrum as well as to the ultraviolet region.

10. A light-sensitive reproduction material comprising
a support, and
a light-sensitive layer coated on said support, said layer comprising tetrabromomethane, ferrocene, 2-methyl-indole, and dimethylamino-benzaldehyde, said layer being sensitive to the visible region of the spectrum as well as to the ultraviolet region.

11. A method of making a reproduction, which comprises the steps of exposing a reproduction material according to claim 1 under a master to visible light; and fixing said material by heating at 80° C. to 150° C. thereby evaporating ferrocene and halogenated hydrocarbon from said material.

References Cited

UNITED STATES PATENTS

| | | | |
|---|---|---|---|
| 3,046,209 | 7/1962 | Sprague | 204—158 |
| 3,082,086 | 3/1963 | Sprague | 96—48 |
| 3,095,303 | 6/1963 | Sprague et al. | 96—33 |
| 3,109,736 | 11/1963 | Sprague et al. | 96—90 |
| 3,164,467 | 11/1965 | Sprague et al. | 96—48 |
| 3,056,673 | 10/1962 | Wainer | 96—48 |
| 3,164,467 | 1/1965 | Sprague et al. | 96—90 |
| 3,335,008 | 8/1967 | Dubosc | 96—92 |

NORMAN G. TORCHIN, *Primary Examiner.*

C. DAVIS, *Assistant Examiner.*

U.S. Cl. X.R.

96—90